(12) United States Patent
Jones et al.

(10) Patent No.: US 7,181,410 B1
(45) Date of Patent: *Feb. 20, 2007

(54) GOAL ORIENTED TRAVEL PLANNING SYSTEM

(75) Inventors: Terrell B. Jones, Arlington, TX (US); Joseph R. Offutt, Jr., Grapevine, TX (US)

(73) Assignee: Travelocity.com LP, Forth Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/141,264

(22) Filed: Aug. 27, 1998

(51) Int. Cl.
  *G01C 21/36* (2006.01)
  *G06Q 10/00* (2006.01)
  *G06F 17/30* (2006.01)

(52) U.S. Cl. .................. 705/6; 705/5; 705/1; 707/201

(58) Field of Classification Search .................. 705/5, 705/6; 701/201, 200, 207, 208, 209, 202; 340/990, 994, 995; 379/88.1, 207
See application file for complete search history.

(56) References Cited

U.S. PATENT DOCUMENTS

| | | | | |
|---|---|---|---|---|
| 5,214,689 A | * | 5/1993 | O'Sullivan | 379/88.1 |
| 5,940,803 A | * | 8/1999 | Kanemitsu | 705/6 |
| 5,948,040 A | * | 9/1999 | DeLorme et al. | 701/201 |
| 5,982,298 A | * | 11/1999 | Lappenbusch | 340/905 |
| 6,009,403 A | * | 12/1999 | Sato | 705/6 |
| 6,085,976 A | * | 7/2000 | Sehr | 235/384 |
| 6,119,094 A | * | 9/2000 | Lynch et al. | 705/5 |
| 6,119,095 A | * | 9/2000 | Morita | 705/5 |
| 6,163,748 A | * | 12/2000 | Guenther | 701/202 |
| 6,209,026 B1 | * | 3/2001 | Ran et al. | 709/218 |

FOREIGN PATENT DOCUMENTS

| | | | |
|---|---|---|---|
| JP | 408106492 A | * | 4/1996 |
| JP | 409212563 A | * | 8/1997 |

OTHER PUBLICATIONS

Press release,"TRAVELOCITY: Take the stress out of summer vacation planning with Travelocity travel web site,", M2 Presswire; Coventry; May 6, 1998 extracted on Internet on May 10, 2001.*
Schley, Robert, "Travel planning online", The Futurist; Washington; Nov./Dec. 1997 extracted on Internet on May 10, 2001.*
Press release, "ICL Nets Contract for Birmingham Transit Info System", Intelligent Highway, v5, n2, pN/A, Ma 1, 1993, 1 page, word count 399, from Dialog database, Item 9 from file 16, document No. 02834213, supplier No. 43812678, extracted on Int.*

* cited by examiner

*Primary Examiner*—Yogesh C. Garg
(74) *Attorney, Agent, or Firm*—Alston & Bird LLP

(57) ABSTRACT

A travel system for processing travel requests based on a user's travel destination goal such as a meeting place and time. The travel system selects a destination terminal, if one is not provided, and estimates a travel time between the destination terminal and the destination goal. An itinerary is then built interactively with the user selecting air, bus or train transportation, ground transportation, and, optionally, hotels, restaurants, and activities.

1 Claim, 18 Drawing Sheets

YOUR DESTINATION

STREET ADDRESS

CITY

STATE

GOAL SEEKER

YOUR APPOINTMENT

DATE

TIME

*FIG. 2B*

GOAL SEEKER SUGGESTS...

ZZZ RENT A CAR

INTERMEDIATE CAR

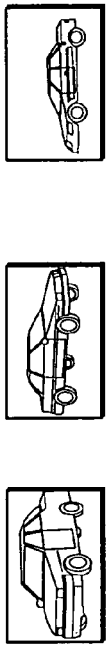

| CAR SIZE AND TYPE | INTERMEDIATE CAR AUTOMATIC WITH AIR CONDITIONING |
| --- | --- |
| CAR COMPANY | |
| CAR RENTAL CITY | LAGUARDIA - NEW YORK |
| PICK UP ON | SEPTEMBER 9, 10:00 AM |
| RETURN ON | SEPTEMBER 10, 10:00 AM |
| RATE* | 86.99 DAILY STANDARD RATE |
| EXTRA DAY AND HOUR RATE | 86.99 PER DAY, 29.00 PER HOUR |
| MILEAGE ALLOWANCE | UNLIMITED |

OTHER CARS    BUY NOW

SINCE YOU ARE STAYING OVERNIGHT WOULD YOU LIKE A RESTAURANT RECOMMENDATION?

NEXT

*FIG. 5B*

GOAL SEEKER

SUGGESTS...

| | CUISINE | AMBIANCE | SPECIAL FEATURES |
|---|---|---|---|
| ▷ ABRUZZI    CLICK ON RESTAURANT FOR INFO<br>37 WEST 56TH STREET - NEW YORK, NY 10019<br>PHONE: 212-489-8111<br>ITALIAN, ITALIAN<br>[MAPS] [DRIVING DIRECTIONS] [VISITOR REVIEWS] [RESERVATIONS] | ITALIAN | BRIGHT LIGHTS<br>FESTIVE<br>ROMANTIC | TRANSMEDIA<br>FAMILY |
| | CUISINE | AMBIANCE | SPECIAL FEATURES |
| ▷ BAY LEAF<br>49 WEST 56TH STREET - NEW YORK, NY 10019<br>PHONE: 212-957-1818<br>INDIAN, INDIAN<br>[MAPS] [DRIVING DIRECTIONS] [VISITOR REVIEWS] [RESERVATIONS] | INDIAN | ELEGANT<br>FESTIVE<br>QUIET<br>ROMANTIC | TRANSMEDIA |
| | CUISINE | AMBIANCE | SPECIAL FEATURES |
| ▷ BEEFSTEAK CHARLIES<br>851 8TH AVE - NEW YORK, NY 10019<br>PHONE: 212-757-3110<br>AMERICAN, AMERICAN<br>[MAPS] [DRIVING DIRECTIONS] [VISITOR REVIEWS] [RESERVATIONS] | AMERICAN | FESTIVE<br>NEIGHBORLY | VIDEO ARCADE<br>FAMILY |

FIG. 6B

HERE'S THE CLOSEST MATCH FOR YOUR ITINERARY.

THE FARE FOR THIS ITINERARY IS $578 PER PERSON, $1156 FOR 2 PASSENGERS

|  |  | AIRLINE | FLIGHT | DEPARTURE | ARRIVAL | STOPS | MEAL |
|---|---|---|---|---|---|---|---|
| OUTBOUND | REQUESTED |  |  | DEN 25 SEP 9:00 AM | SJC |  |  |
|  | BEST FIT | UA | 279 | DEN 25 SEP 8:25 AM | SJC 9:55AM | 0 | S |
| RETURN | REQUESTED |  |  | SJC 3 OCT | DEN 6:00PM |  |  |
|  | BEST FIT | UA | 708 | SJC 3 OCT 2:25PM | DEN 5:52 PM | 0 |  |

NOW LET'S WORK ON FINDING YOU A LOWER FARE.

TO DO THIS, WE MAY NEED TO ADJUST YOUR ITINERARY, THE MORE FLEXIBLE YOU CAN BE, THE MORE LIKELY WE CAN FIND YOU A BETTER DEAL.

HERE ARE SOME WAYS WHERE FLEXIBILITY MAY PAY OFF. PLEASE CLICK ON THE APPROPRIATE BUTTONS TO TELL US HOW WILLING YOU ARE TO ADJUST:

OUTBOUND JOURNEY

| THIS IS HOW FLEXIBLE I AM ON<br><br>DEPARTING ONE DAY EARLIER:<br><br>○○○○○○○○●<br><br>COMPLETELY.................NOT<br>AT ALL | THIS IS HOW FLEXIBLE I AM ON<br><br>DEPARTING ONE DAY LATER:<br><br>○○○○○○○○●<br><br>COMPLETELY.................NOT<br>AT ALL |
|---|---|

*FIG. 8B*

| THIS IS HOW FLEXIBLE I AM ON DEPARTING ONE DAY EARLIER: ○○○○○○○⦿ COMPLETELY..................NOT AT ALL | THIS IS HOW FLEXIBLE I AM ON DEPARTING ONE DAY LATER: ○○○○○○○⦿ COMPLETELY..................NOT AT ALL |
|---|---|
| THIS IS HOW FLEXIBLE I AM ON DEPARTURE AND/OR ARRIVAL TIME: ○○○○○○○⦿ COMPLETELY..................NOT AT ALL | THIS IS HOW FLEXIBLE I AM ON CONNECTING FLIGHTS VERSUS DIRECT: ○○○○○○○⦿ COMPLETELY..................NOT AT ALL |
| THIS IS HOW FLEXIBLE I AM ON ALTERNATIVE DEPARTURE CITY (UP TO 50 MILES DISTANT): ○○○○○○○⦿ COMPLETELY..................NOT AT ALL | THIS IS HOW FLEXIBLE I AM ON ALTERNATIVE ARRIVAL CITY (UP TO 50 MILES DISTANT): ○○○○○○○⦿ COMPLETELY..................NOT AT ALL |

LENGTH OF STAY

| THIS IS HOW FLEXIBLE I AM ON LEAVING EARLIER TO INCLUDE A SATURDAY NIGHT ○○○○○○○⦿ COMPLETELY..................NOT AT ALL | THIS IS HOW FLEXIBLE I AM ON RETURNING LATER TO INCLUDE A SATURDAY NIGHT: ○○○○○○○⦿ COMPLETELY..................NOT AT ALL |
|---|---|

*FIG. 8C*

HERE'S THE ORIGINAL ITINERARY.

THE FARE FOR THIS ITINERARY IS $578 PER PERSON, $1,156 FOR 2 PASSENGERS

|  |  | AIRLINE | FLIGHT | DEPARTURE | ARRIVAL | STOPS | MEAL |
|---|---|---|---|---|---|---|---|
| OUTBOUND | REQUESTED |  |  | DEN 25 SEP 9:00 AM | SJC |  |  |
|  | BEST FIT | UA | 279 | DEN 25 SEP 8:25 AM | SJC 9:55 AM | 0 | S |
| RETURN | REQUESTED |  |  | SJC 3 OCT | SJC 6:00 PM |  |  |
|  | BEST FIT | UA | 708 | SJC 3 OCT 2:25 PM | SJC 5:52 PM | 0 |  |

HERE ARE SOME ALTERNATIVES, IN ASCENDING PRICE SEQUENCE.

OPTION1: FARE $198 PER PERSON, #396 FOR 2 PASSENGERS*

|  |  | AIRLINE | FLIGHT | DEPARTURE | ARRIVAL | STOPS | MEAL |
|---|---|---|---|---|---|---|---|
| OUTBOUND | REQUESTED |  |  | DEN 25 SEP 9:00 AM | SJC |  |  |
|  | OPTION 1 | QQ | 1427 | DEN 25 SEP 7:48 AM | RNO 8:23 AM | 0 | S |
|  |  | QQ* | 1633 | RNO 9:38 AM | OAK* 10:28 AM | 0 |  |
| RETURN | REQUESTED |  |  | SJC 3 OCT | DEN 6:00 PM |  |  |
|  | OPTION 1 | QQ | 1335 | OAK* 3 OCT 1:50 PM | RNO 2:40 PM | 0 |  |
|  |  | QQ* | 1708 | RNO 3:22 PM | DEN 5:37 PM | 0 |  |

*FIG. 8D*

GOAL ORIENTED TRAVEL PLANNING SYSTEM

BACKGROUND OF THE INVENTION

1. Field of the Invention

This invention generally relates to travel processing systems and, more particularly, to a system for receiving a traveler's travel goals and determining possible travel options by searching a travel database.

2. Description of the Related Art

Computer systems for arranging airline travel are commonly used. Existing reservation systems allow a traveler or user to select the days that they wish to travel and their origination and destination sites. Based on these selections, the system tells the user both the fares available and the companies offering the fares.

These existing systems require the traveler to guess at what time they need to arrive at the destination airport to reach their final destination, such as the location of a meeting, on time. The traveler must determine the time required to travel from the airport to the final destination site and research what types of ground transportation are available at the destination airport. The traveler must then research which hotels, restaurants, and other activities are close to their final destination point of interest and make separate reservations.

Based on the above limitations of existing systems, it is desirable to improve travel processing systems to provide greater assistance to the traveler.

SUMMARY OF THE INVENTION

Systems and methods consistent with the present invention include structure and acts for processing travel requests based on a user's travel destination goal. That is, the user inputs a travel goal (e.g., the time and location of a meeting) and the system automatically generates a travel itinerary, including flight information, hotel information, and ground transportation such as rental cars, to ensure that the user accomplishes their travel goal (e.g., arrives at the meeting on time).

In accordance with systems and methods consistent with the present invention, a traveler's itinerary is generated interactively with a user by selecting flights, hotels, transportation, and other activities. To generate such an itinerary, the user first inputs a goal, like a meeting place and time. The travel system selects a destination airport, if one is not provided, and estimates a travel time between the destination airport and the destination goal. The travel system determines recommended flights and ground transportation to the user by searching a travel database having data on both and then displays the recommendations to the user. Similarly, restaurant and activity information may also be found in the database, and as such, appropriate recommendations may be displayed to the user based on user-designated constraints or default constraints.

In one embodiment of the present invention, systems and methods are provided for processing travel requests including structure or steps for receiving a user's travel goal specifying a destination location and an appointment time and determining a time of arrival necessary at a destination airport sufficient to ensure that the user arrives at the destination location at the appointment time.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings,

FIG. 2b depicts a sample screen display for entering travel parameters consistent with the present invention;

FIG. 5b depicts a sample screen display showing ground transportation information consistent with the present invention;

FIG. 6b depicts a sample screen display showing restaurant recommendations consistent with the present invention;

FIG. 8b depicts a sample screen display showing an itinerary and criteria the user may adjust;

FIG. 8c depicts a sample screen display of additional criteria the user may designate as flexible consistent with the present invention; and FIG. 8d depicts a sample screen display of an original itinerary and a reviewed itinerary based on relaxed constraints.

DETAILED DESCRIPTION

Figure 1:
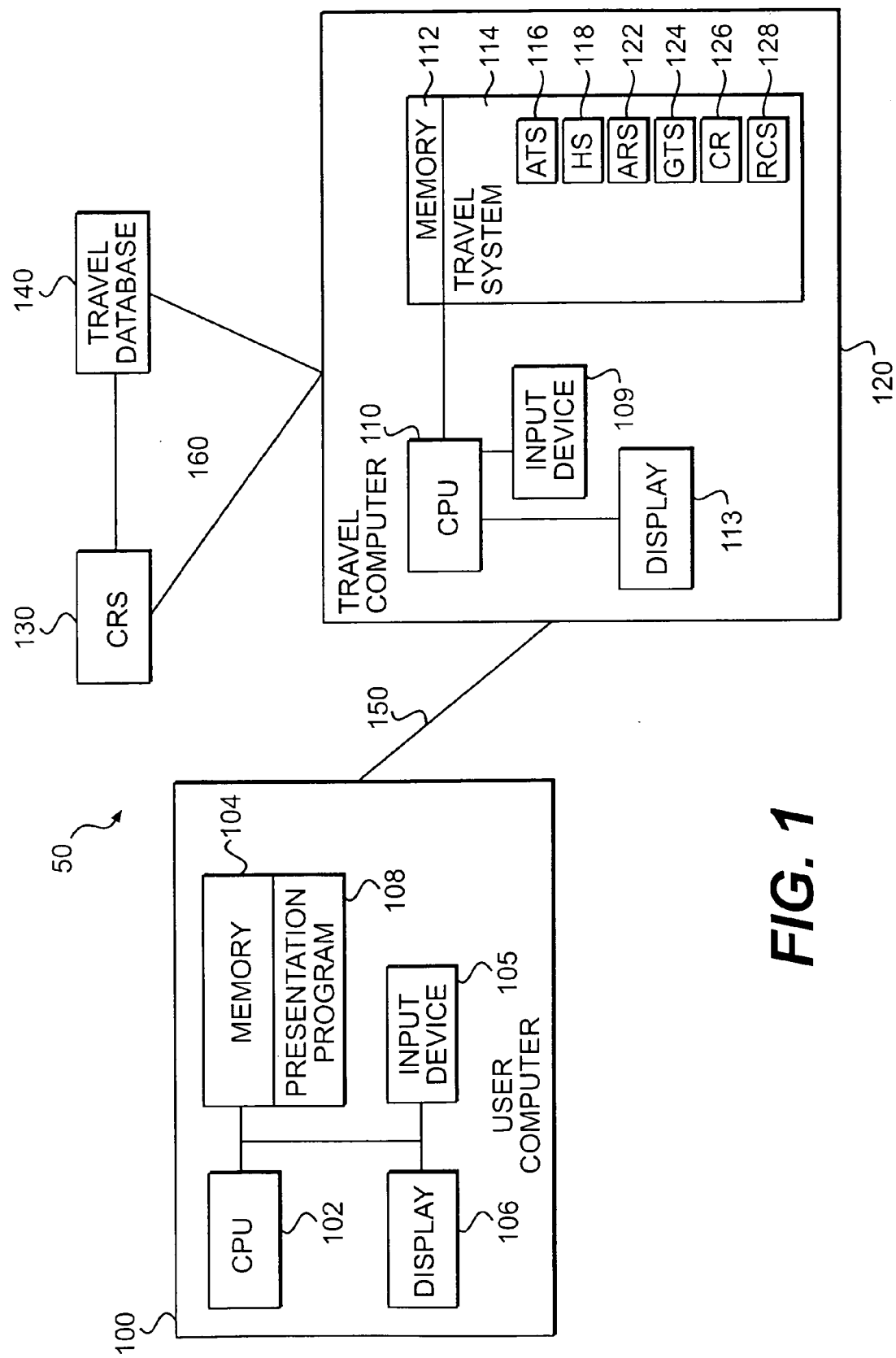
FIG. 1 depicts a data processing system suitable for use by systems and methods consistent with the present invention.

Reference will now be made in detail to the construction and operation of implementations consistent with the present invention illustrated in the accompanying drawings. In those drawings, like elements and operations are designated with the same reference numerals where possible.

Systems consistent with the present invention provide a travel system that generates a user's travel itinerary based on the user's travel goal. In one implementation, the travel itinerary includes air transportation; however in other implementations the itinerary includes a different type of transportation service where a third party provides scheduled transportation to consumers using a facility that carries consumers in groups, such as a train or bus. The travel system generates the itinerary interactively with a user by selecting, in one case, flights, hotels, ground transportation, restaurants, events, and other activities. A user need only input a goal, including a destination and required time to be at that destination, and based on this goal information, the travel system presents the user with alternatives that allow the user to meet these criteria. Other convenient information is presented to the user that is specifically tailored to the users' travel plans, including hotels, restaurants, and activities in the vicinity of the users travel goal.

In using the travel system, the user initially inputs the destination time and site and an origination site. The travel system then estimates the time necessary to arrive at a destination airport to reach the destination site at the designated time. After making the estimate, the travel system sends display data to a display located at the user's site for displaying travel options, including potential departure and arrival flights, hotels, restaurants and activities.

A goal can include multiple stops in one location at different times, multiple cities, multiple meetings in multiple cities, non-round trip travel, and round trip travel. The processing of a goal that requires several different stops in different locations is performed in steps. For example, if a user wishes to travel from New York to San Francisco to Seattle, the travel from New York to San Francisco is processed first and then travel from San Francisco to Seattle is processed as discussed below. For clarity the only type of goals used in the examples below are between a single origination to a single destination. The system may easily be altered to process many different goal combinations.

FIG. 1 depicts a data processing system 50 for use with systems and methods consistent with the present invention, although other system configurations are contemplated. The data processing system 50 comprises a user computer 100 connected to travel computer 120 via a communication link 150, such as a direct network link, a modem, or the Internet. The travel computer 120 is connected to a computerized reservation system (CRS) 130 via communication link 160. Both the travel computer 120 and CRS 130 have access to a travel database 140.

Travel database 140 represents a plurality of databases containing many different types of data including, for example, flight information, hotel information, ground transportation information, activity information, airport information, map information, and travel distance and time information. Travel database 140 may be maintained by travel computer 120 or CRS 130. Travel database 140 may be a virtual database, including data from multiple sources, for example, servers on the world wide web.

The user computer 100 has a central processing unit (CPU) 102, a memory 104, an input device 105, and a display 106. The memory 104 contains a presentation program 108 that displays various screens to the user via the display 106, receives input from the user, and sends this input to the travel computer 120. Available applications suitable for these purposes include Internet browsers such as the Netscape Navigator.

Travel computer 120 includes an input device 109, display 113, a CPU 110, and a memory 112. The memory 112 includes the travel system 114 of an exemplary implementation. The travel system 114 processes travel requests from the presentation programs on user computers and stores information about travel options. The travel system 114 includes an air transportation subsystem (ATS) 116 that selects flights or flights and prices, a hotel subsystem (HS) 118 that selects a hotel, an activity and restaurant subsystem (ARS) 122 that identifies restaurants and activities in the vicinity of the hotel or the destination site, a ground transportation subsystem (GTS) 124 that selects suitable ground transportation, a constraint relaxation subsystem (CR) 126 for relaxing search constraints, and a reservation confirmation system (RCS) 128 that verifies the travel selections and confirms any reservations.

CRS 130 is an existing transportation standard system that maintains information in a travel database 140 that relates to travel flight times and fares for each of the different airlines among other flight information. Reservations are made through CRS 130. CRS 130 manages flight reservation information based on each user's desired origination-to-destination journey. CRS 130 generally arranges, organizes, and stores this data in a format generally corresponding to the dominant travel routing patterns, in which a carrier accepts a passenger at a first, origination location and discharges the passenger at a terminal or destination location.

Booking a flight through CRS 130 involves creating a itinerary computer record As flights are booked for different carriers, the system sends a message with the flight information to the airline's computers. The itinerary computer record is used to generate tickets and store itineraries.

In accordance with the present invention, a user inputs travel parameters to the presentation program 108 on the user computer 100, which parameters are sent to the travel system 114 on the travel computer 120 for processing. The user may use a graphical user interface (GUI) to interface with the user computer 100, enter travel parameters and view travel information. These travel parameters include a destination, such as both the location of a meeting and the time of the meeting, and the user's origination site. Additionally, the user may input other parameters, such as an origination airport, origination city, destination city, destination airport, required arrival date and time, duration of visit, or required return time or date. For example, the user may indicate that he wishes to arrive at 123 Main St., New York at three o'clock in the afternoon and that he is leaving from Washington, D.C. The user may also designate additional preferences, such as leaving from National Airport and arriving in LaGuardia Airport in New York. A user's profile may also be maintained in the memory 112 or an external storage system accessible by the travel computer 120 or the user computer 100 which includes travel preferences, such as preferred seats, airports, airlines, airplanes, modes of ground transportation such as rental cars, price range, or a seat class. After inputting the various parameters, the travel system generates an itinerary that ensures the user will arrive at the destination site on time in the manner he prefers.

Figure 2A:
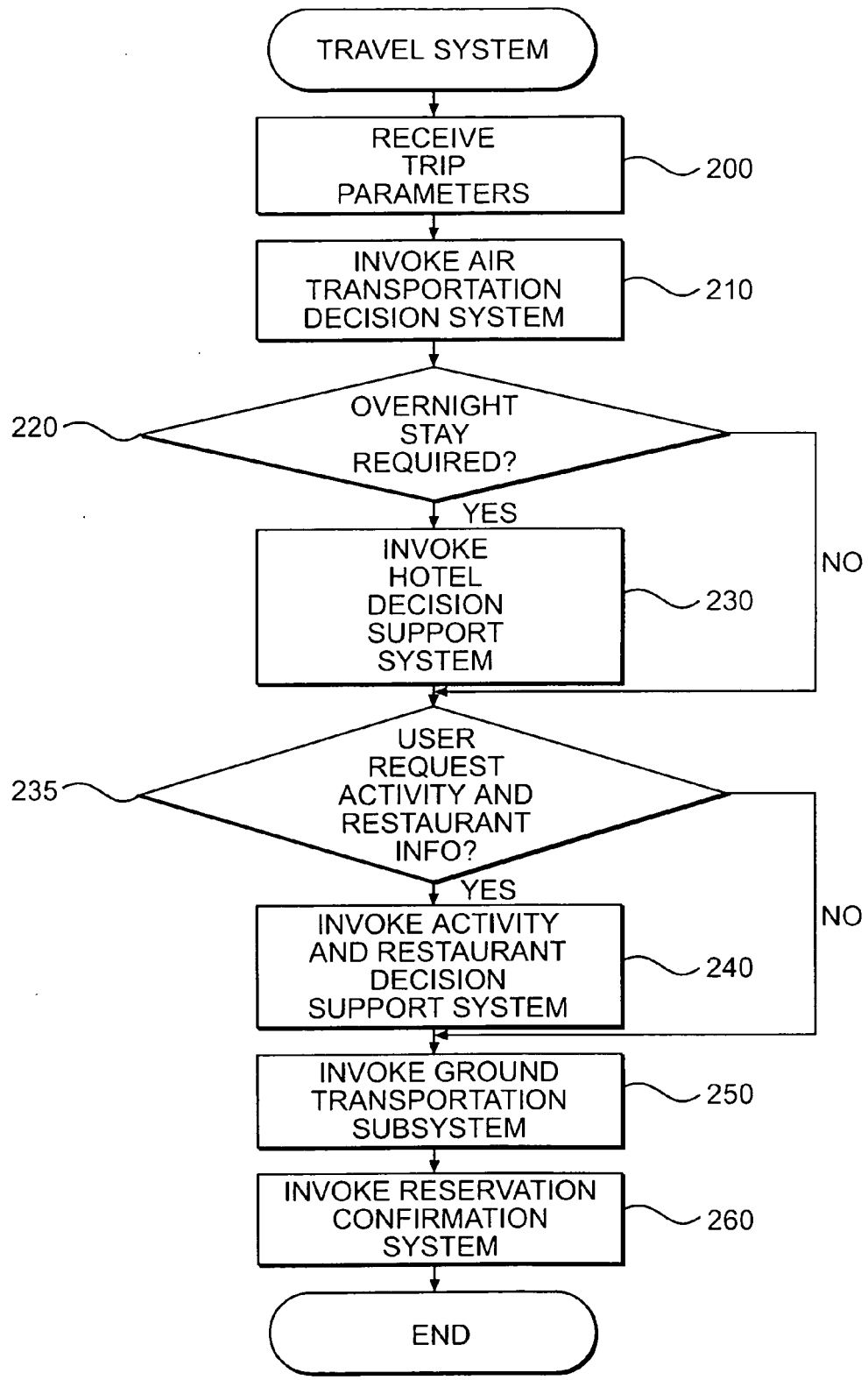
FIG. 2a depicts a flow chart of the steps performed by the travel system consistent with the present invention.

A process consistent with one implementation of the present invention will now be described in connection with FIGS. 2–8. The process steps may be performed in many different orders, only one of which is illustrated. FIG. 2a depicts a flowchart of the general steps of the travel system 114 of one embodiment of the present invention. First, the travel system 114 receives travel parameters from the user of the user computer 100 via the presentation program 108 (step 200). FIG. 2b shows an example initial screen displayed by the presentation program 108 to the user. Using this screen, the user may enter destination information such as an address, city, state, and time of appointment. After receiving the parameters, travel system 114 invokes the air transportation subsystem 116 to select flights or flights and prices (step 210). Travel system 114 then determines whether an overnight stay is necessary by determining whether the departure and return dates are the same (step 220). If different, the hotel subsystem 118 is invoked to select a hotel (step 230). The travel system 114 then determines whether it has received an indication from the presentation program of whether the user wants activity and restaurant information (step 235). If the user requests activity and restaurant information, the travel system 114 invokes the activity and restaurant subsystem 122 to find restaurants and activities in the vicinity of the selected hotel or the destination site (step 240). After invoking the activity and restaurant subsystem 122 (step 240), or if the user does not want activity and restaurant information (step 235), travel system 114 invokes the ground transportation subsystem 124, which allows the user to select ground transportation such as cars (step 250). Finally, travel system 114 invokes the reservation confirmation system 128 allowing the user to verify travel selections and confirm reservations with the providers (step 260).

Figure 3A:
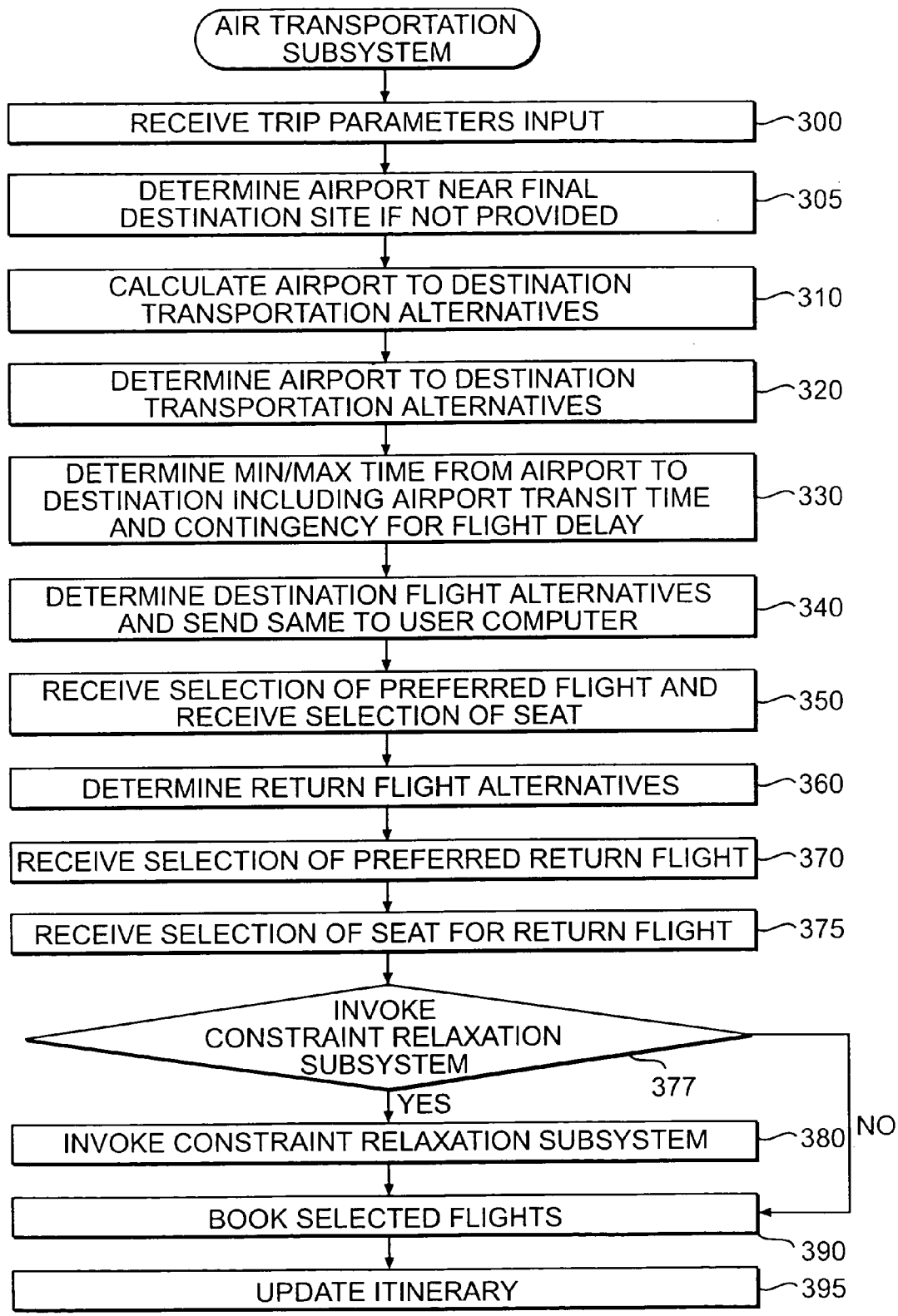
FIG. 3a depicts a flow chart of the steps performed when selecting flights consistent with the present invention.

FIG. 3a shows more detailed steps of the air transportation subsystem 116 according to one embodiment of the present invention. First, the air transportation subsystem (ATS) 116 receives the user's travel parameters from the travel system 114 (step 300). Then ATS 116 identifies the destination airport closest to the destination, if the closest airport was not provided by the user (step 305). Based on the identified destination airport and the destination site, ATS 116 refers to data in travel database 140 to determine a distance between the destination airport and the destination site (step 310).

ATS 116 determines what ground transportation alternatives are available at the destination airport by referring to travel database 140 (step 320). ATS 116 determines the minimum and maximum ground travel time from the destination airport to the destination based on the distance between the airport and the destination, the modes of transportation available, the time of day of the travel, taking into account possible flight delays (step 330).

Based on the user's preferred arrival time at the destination and knowing the minimum and maximum time for ground travel between the destination airport and the destination, ATS 116 can calculate a flight arrival time at the destination airport. ATS 116 then searches travel database 140 for flights from the origination airport to the destination airport that arrive at the flight arrival time to find flight alternatives available to the user and sends this information to the presentation program for display to the user (step 340). The presentation programs also display seat alternatives for the available flights.

After displaying this information, the user may select a preferred flight and seat, and the presentation program sends these selections to ATS 116 (step 350). ATS 116 searches for return flight alternatives and sends data reflecting the same to the presentation program 108 (step 360). The presentation program 108 displays this information to the user, who may then pick a preferred return flight which is reported to ATS 116 (step 370) and select a seat which is reported to ATS 116 (step 375). Step 360 may be skipped if the user is not returning to the origination location. In addition the return flight search may be replaced by a next destination flight search if the user is moving on to another location.

Figure 3B:
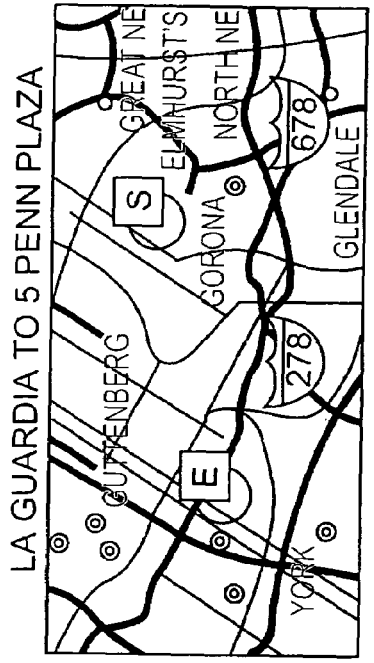
FIG. 3b depicts a sample screen display showing a map and available flights consistent with the present invention.
Figure 3C:
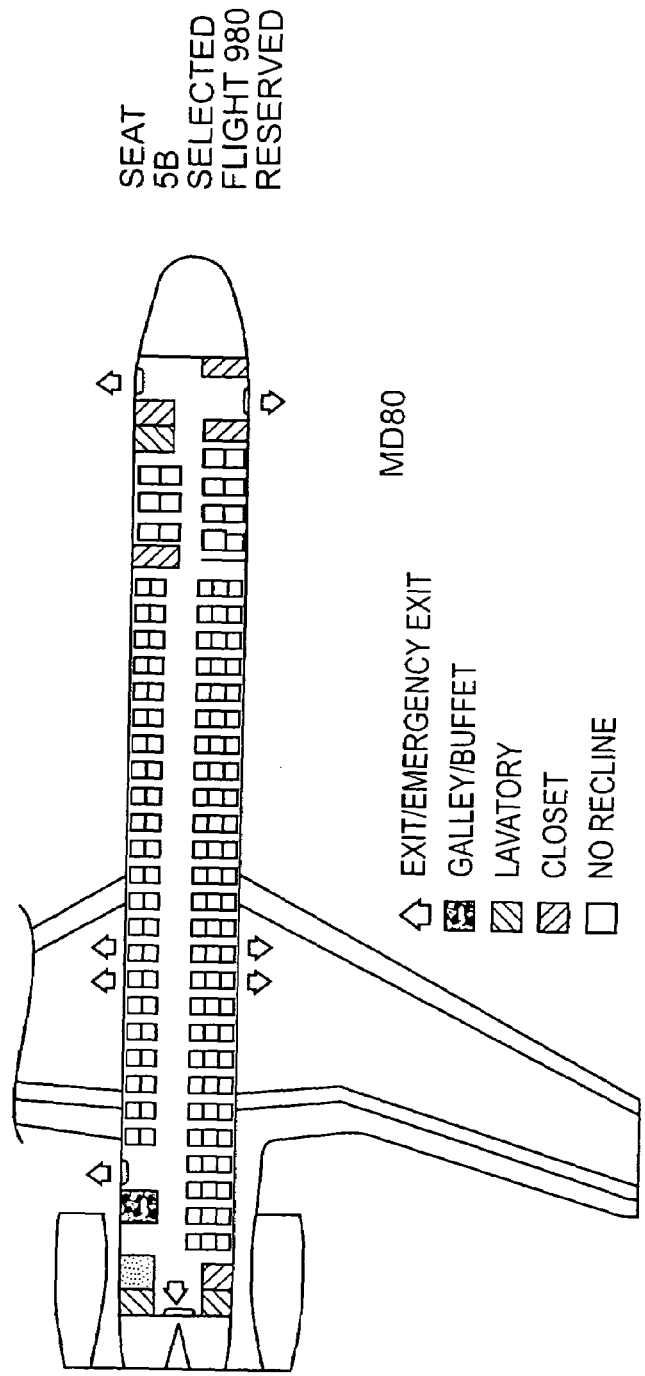
FIG. 3c depicts a sample screen display showing the interior of a plane for the user to select a seat consistent with the present invention.

FIGS. 3b–3c show example screen displays presented on display 106 by presentation program 108. FIG. 3b shows a screen display with a map of the location of the destination and location of the destination airport. FIG. 3b also shows available flights and their times and prices from the origination city to the destination city. FIG. 3c shows a picture of the plane so that the user may select a seat.

Referring again to FIG. 3a, if the user has not found a suitable flight, the user may indicate to run the constraint relaxation subsystem (CR) 126 (step 377). If the user so indicates, ATS 116 runs the CR 126 subsystem to allow the user to consider alternative flights and to select one (step 380). After selecting a flight in either step 350 or step 370, ATS 116 will select or book selected flights using CR 126 (step 390) and will update an itinerary that is maintained with all the choices made by the user (step 395).

Figure 4A:
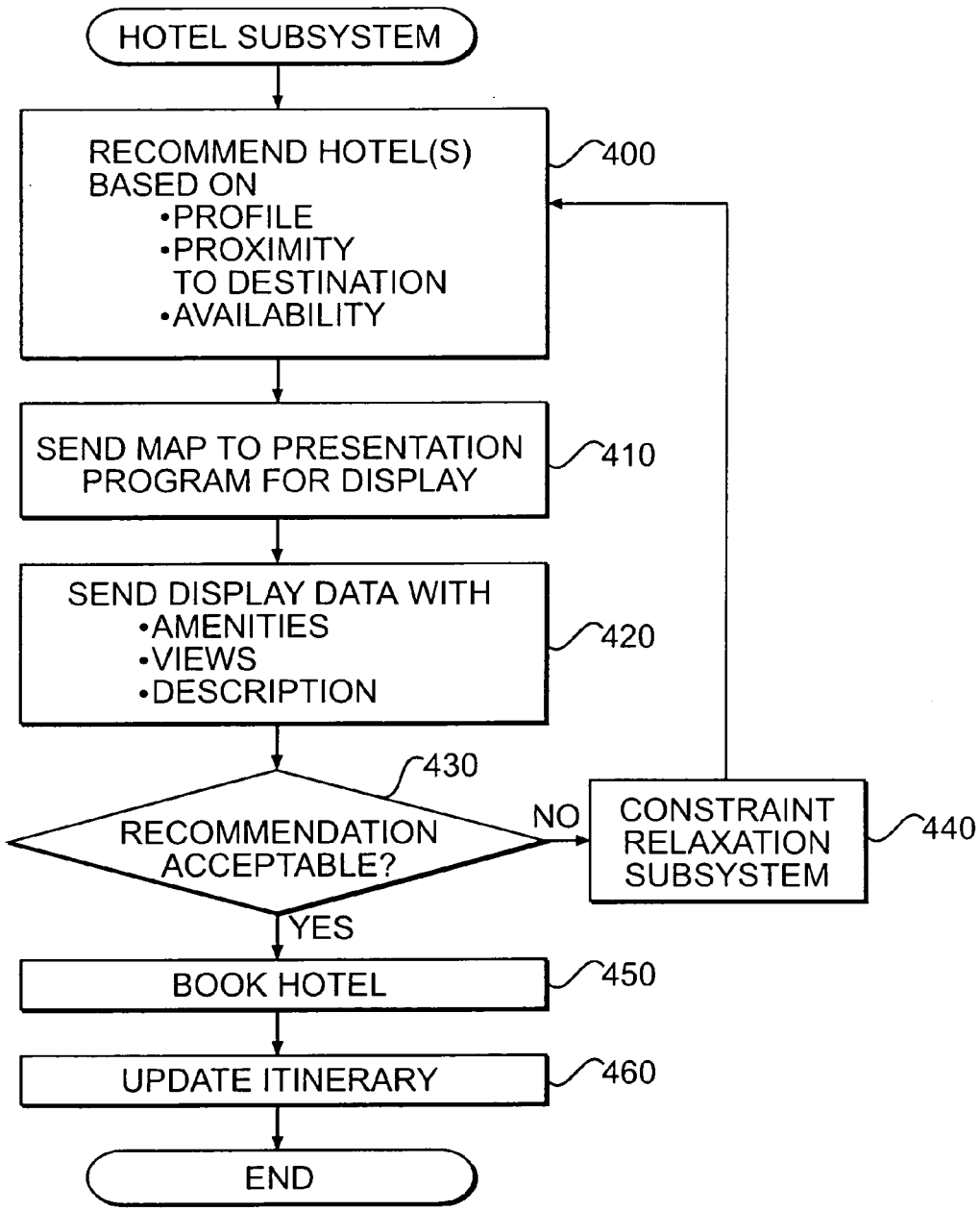
FIG. 4a depicts a flow chart of the steps performed when selecting hotels consistent with the present invention.
Figure 4B:
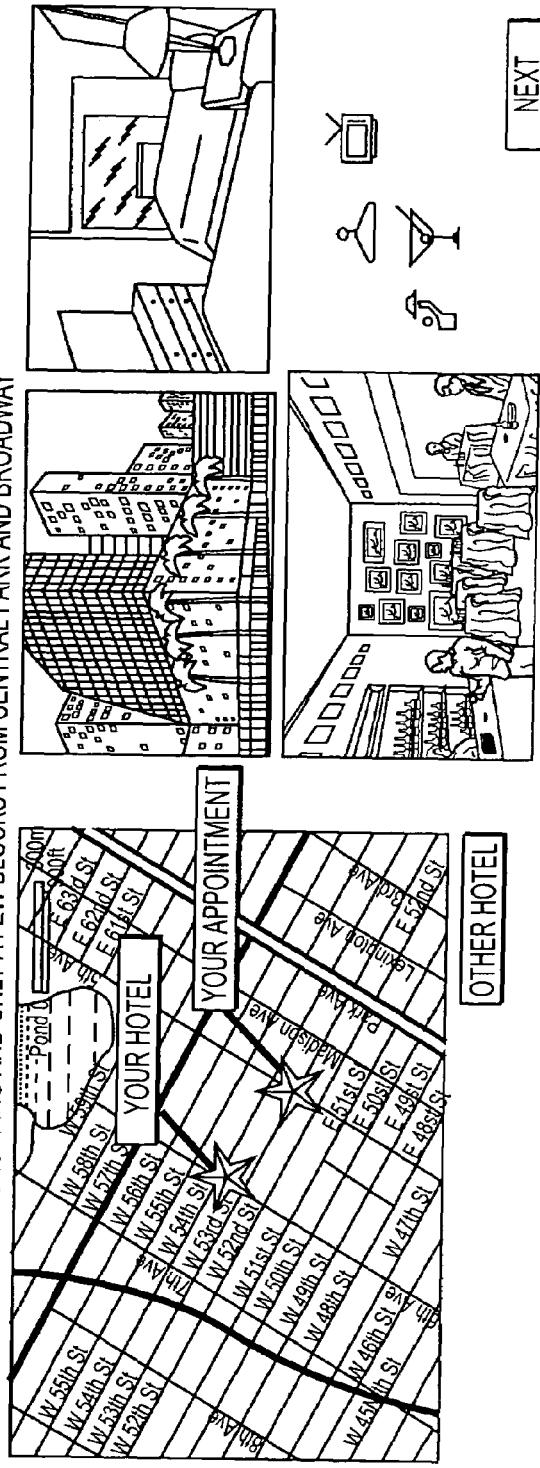
FIG. 4b depicts a sample screen display showing a map with a hotel location and other information about the hotel consistent with the present invention.

FIG. 4a is a flow chart of the steps performed by the hotel subsystem 118 (HS). HS 118 recommends hotels based on their proximity to the destination and any other parameters either set by the user or held in a user profile (step 400). HS 118 sends presentation program 108 a map for display that shows the location of the hotel (step 410). Geographic databases are commonly available that show streets and other landmarks. Also included in the display data is other information available in the database 140 about the hotel including hotel amenities (step 420). FIG. 4b shows a map including the location of the selected hotel relative to the location of the destination (i.e., the marker for "Your Appointment"), and information about the hotel. HS 118 receives data from presentation program 108 indicating whether the user has accepted one of the recommendations or rejected all of them (step 430). The user may accept one of the recommendations or reject all the recommendations. If the user does not accept any of the recommendations, the CR 126 re-executes searches using relaxed constraints and is used here to look for a larger range of hotels (step 440) and processing continues with step 400. If HS 118 determines that the user selected a hotel, then HS 118 reserves the hotel using CRS 130 (step 450) and the itinerary is updated (step 460).

Figure 5A:
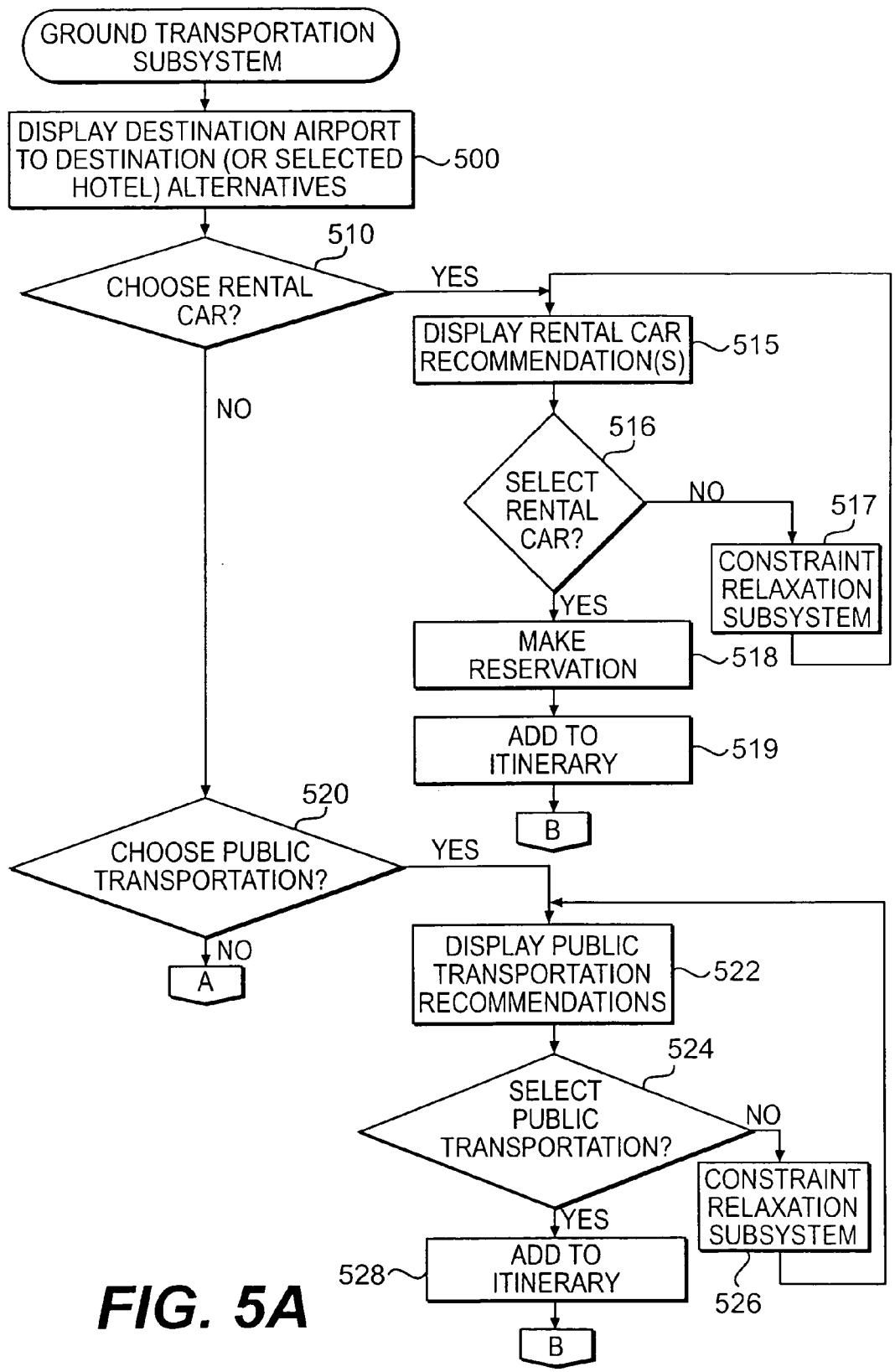
FIGS. 5a and 5c depict flow charts of the steps for selecting ground transportation consistent with the present invention.

FIG. 5a shows the steps performed by the ground transportation subsystem 124 (GTS) for selecting ground transportation from the destination airport to the destination or to a selected hotel. GTS 124 sends the presentation program 108 display data for displaying a map showing the destination airport location, a destination location and a selected hotel location (step 500). The display shown in FIG. 4b includes such an example map display. The user may select one of several different types of transportation. The order in which the user is presented with the available modes of transportation is based on the ground transportation subsystems's recommended mode and a user's preferred mode as designated in a user travel profile. GTS 124 selects a preferred mode for a location from travel database 140. For example, if the user is traveling to New York City, renting a car is the least preferred mode of transportation. It is preferable to take public transportation or private transportation given the lack of parking. The user has the option of accepting the recommendation or choosing an alternative.

In FIG. 5a, GTS 124 sends display data to presentation program 108 providing the user the option of renting a car (step 510). If the user decides to rent a car, then GTS 124 sends display data representing rental car recommendations found in travel database 140 (step 515). FIG. 5b shows an example display on display 106 by presentation program 108 showing a rental car company and information about the car and allows the user the option of reserving it. The user may then select a rental car (step 516) and a reservation is made (step 518). After making the reservation, the rental car is added to the itinerary (step 519). If the user did not select any of the displayed rental car recommendations, then GTS 124 invokes CR 126, broadening the scope of the search for the rental car recommendations by relaxing any constraints such as cost (step 517).

If the user chooses public transportation, GTS 124 sends presentation program 108 display data asking the user if he wishes to select public transportation (step 520), and if so, GTS 124 provides display data listing public transportation recommendations (step 522). The user may select a public transportation mode (step 524) that is then added to the itinerary (step 528). Otherwise, GTS 124 invokes CR 126 relaxing constraints in the search (step 526).

Figure 5C:
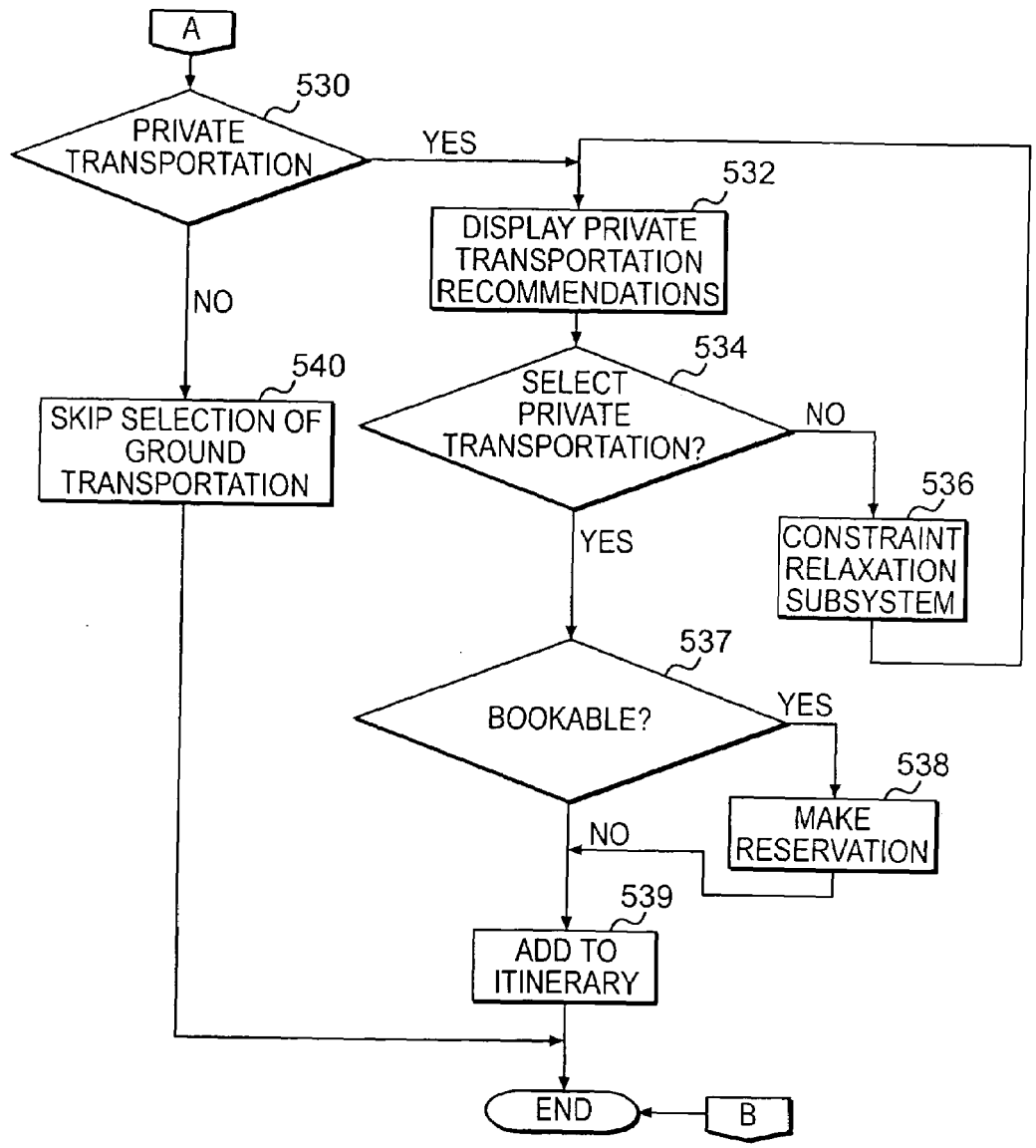

FIG. 5c shows additional steps of the ground transportation system. After determining if the user has selected public transportation, GTS 124 receives an indication from user computer 100 as to whether the user selects private transportation (step 530). If so, GTS 124 sends display data to presentation program 108 of available private transportation (step 532). The user may select one of the available private transportations using input device 105 (step 534) and if found to be reservable by GTS 124 (step 537) a reservation is made by GTS 124 (step 538). GTS 124 adds the transportation to the itinerary (step 539). If it is not reservable, then it is merely added to the itinerary (step 539). If the user did not select any of the modes of transportation, then GTS 124 skips the selection of ground transportation (step 540).

In one embodiment, at any time the user changes their mind and decides not to pursue a transportation type, the user may enter an indication of the same and enter a different transportation branch.

Figure 6A:
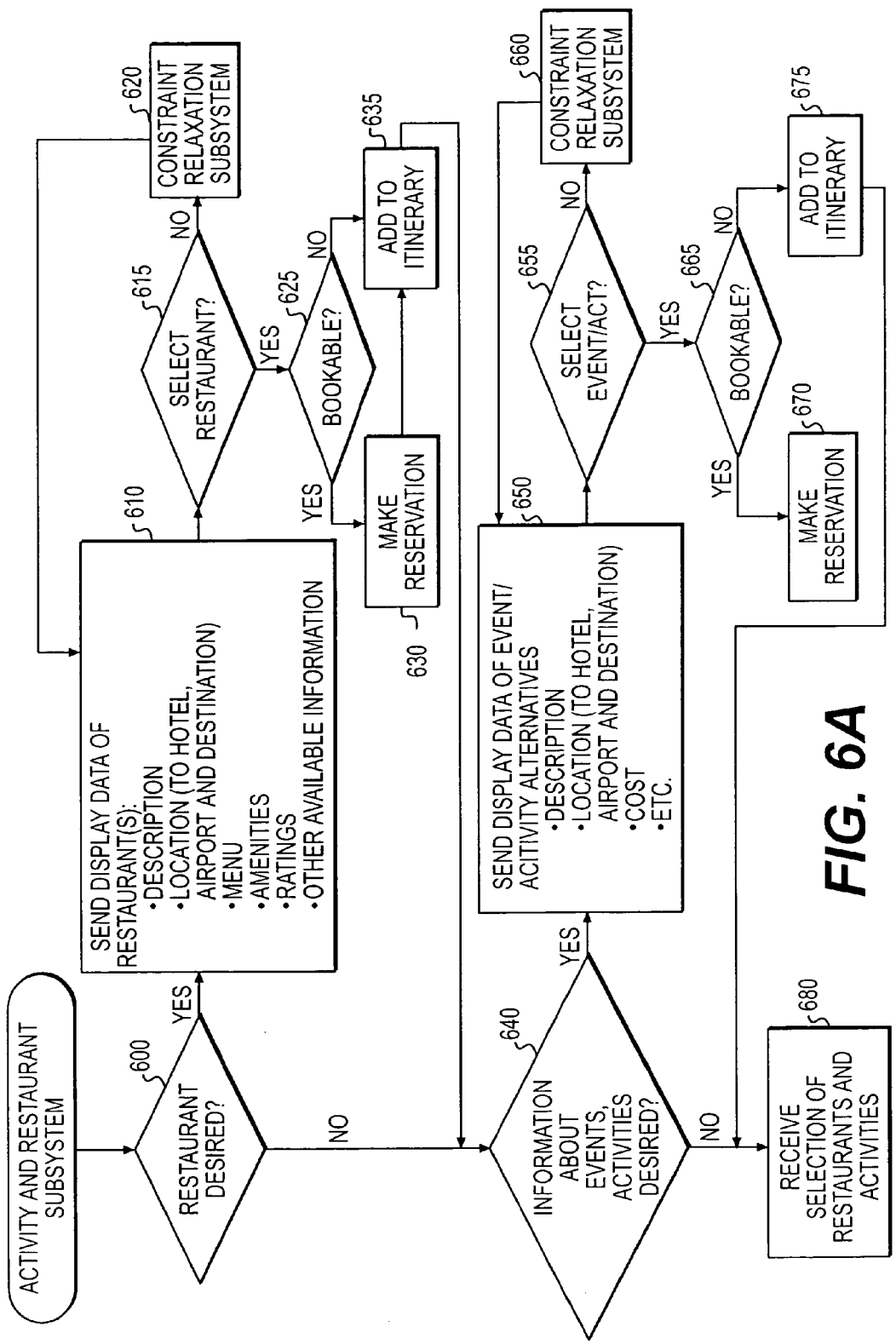
FIG. 6a depicts a flow chart of the steps for selecting restaurants and activities consistent with the present invention.

FIG. 6a shows the general steps for recommending restaurants and activities around the destination by the activity and restaurant subsystem (ARS) 122. ARS 122 refers to a database of restaurants and activities and their addresses held within travel database 140. If a user desires to select a restaurant (step 600) then ARS 122 sends display data to presentation program 108 to display a screen depicting restaurants by searching for geographically close restaurants to the hotel or destination and searching any other constraints entered by the user such as the type of food, amenities, ratings in the travel database (step 610). In this step, ARS 122 sends display data to presentation program 108 which displays a screen like the one shown in FIG. 6B. This screen depicts various restaurants and various features of the restaurants, like average meal cost, level of cleanliness, type of food, etc. The user makes various selections on this screen and the activity and restaurant subsystem performs various processing in response to these selections.

After displaying this screen, the user may enter a selection using input device 105 and presentation program reports the result to ARS 122 (step 615). If the user did not select a restaurant, then ARS 122 invokes CR 126 to allow the user to change any of various constraints on the selection of restaurants (step 620). Otherwise, if the user did select a restaurant and if the restaurant accepts reservations (step 625), ARS 122 makes a reservation (step 630), and the restaurant is added to the itinerary (step 635).

The user may request information about events and activities. If ARS 122 determines that the user requested information about events or activities (step 640), then ARS 122 searches for events and activities that meet any constraints placed by the user, such as requesting shopping or movies, and any found events and activities within a designated distance of the hotel, airport or destination are displayed (step 650). The user may select an event or an activity (step 655) and if reservable (step 665), the ARS 122 makes a reservation (step 670) and it is added to the itinerary (step 675). If no activity or event is selected, ARS 122 invokes CR 126 allowing the user to change any constraints on the types of activities or locations of activities or events (step 660). If the user does not wish to select any restaurants or activities, then the selection of restaurants or activities is skipped and processing continues (step 680).

Figure 7:
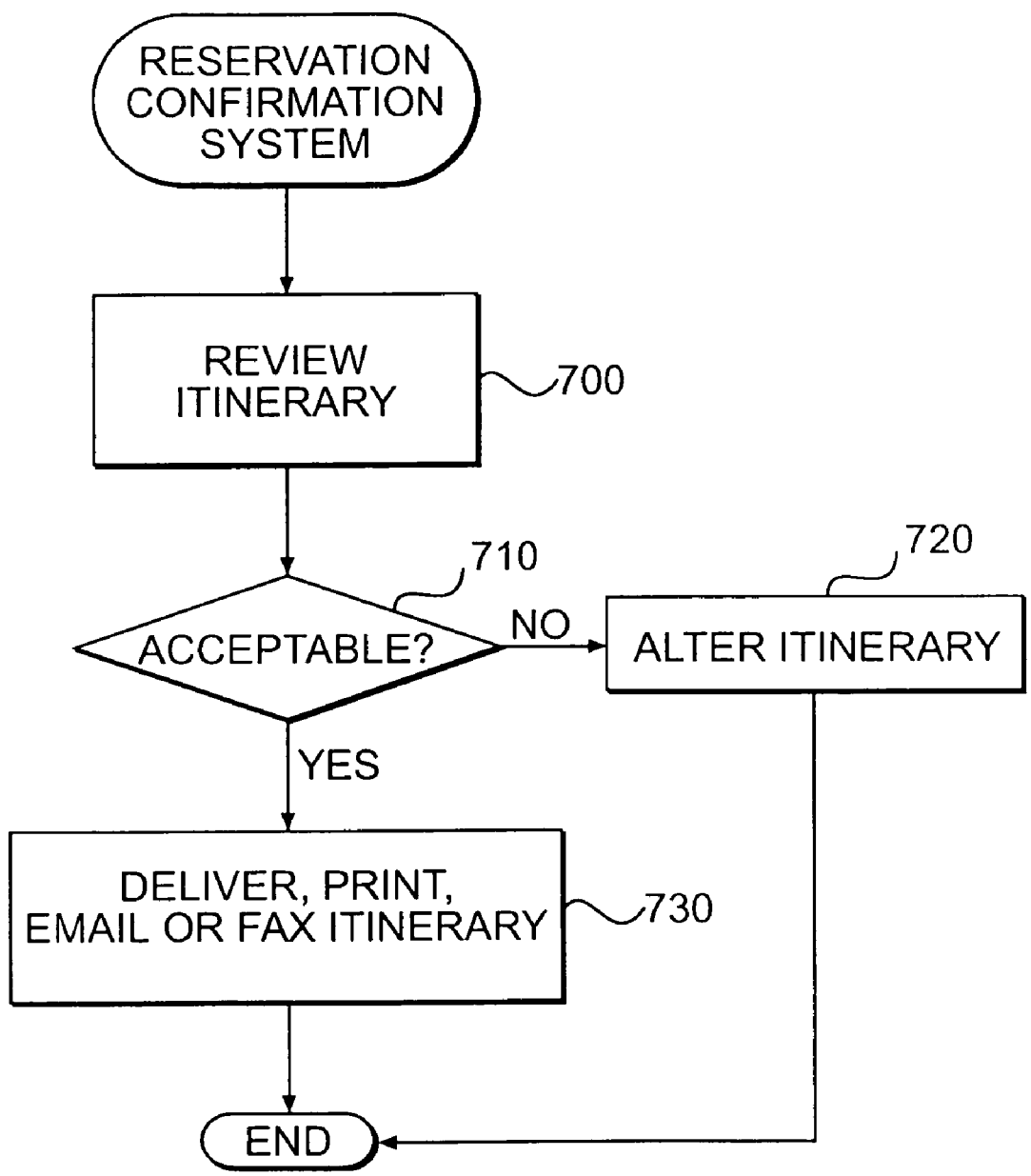
FIG. 7 depicts a flow chart of the steps for reviewing and approving an itinerary consistent with the present invention.

FIG. 7 depicts a flow chart of the steps performed by the reservation confirmation system (RCS) 128, which allows a user to review an itinerary. Once the itinerary is complete, RCS 128 sends display data to presentation program 108 which in turn displays the itinerary for the user to review (step 700). The user indicates using input device 105 whether the itinerary is acceptable (step 710). If the itinerary is not acceptable, the user may alter the itinerary and reenter any of the decision subsystems (step 720). If the itinerary is acceptable, RCS 128 places the itinerary along with the associated restaurant, the maps and any other available information in a trip portfolio for printing, faxing or e-mailing or delivering to the user using any means desired by the user (step 730).

Figure 8A:
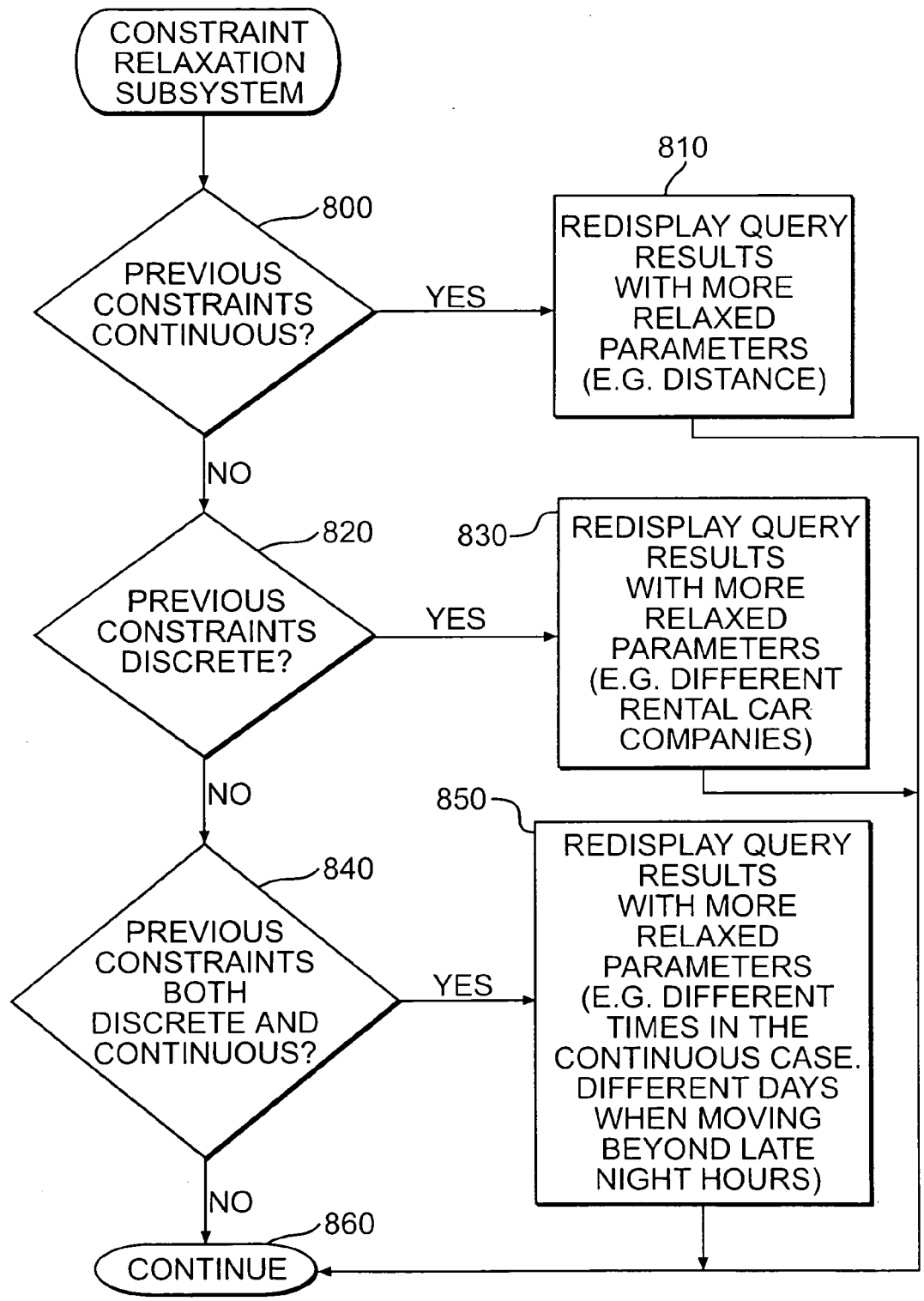
FIG. 8a depicts a flow chart of the steps for relaxing constraints consistent with the present invention.

FIG. 8a depicts a flow chart of the steps performed by CR 126. CR 126 reviews a database query and allows the constraints in the query to be changed or automatically changes the constraints. If constraints in the query were continuous (step 800), such as a distance or time, then CR 126, either automatically or with user's input adjusts the constraint. For example, if the query is to find a restaurant with the constraint of being within 5 miles of a given hotel, the distance constraint may automatically be adjusted to 15 miles and the query rerun and the new results displayed on display 106 by presentation program 108 (step 810). If the previous constraints were discrete (step 820), such as food type, then the discrete constraint is changed by requesting a new entry from the user or using a default entry. For example, if the search is for restaurant with the food type of Italian, the constraint may be changed to American, and the query rerun and results displayed (step 830). If there were both discrete and continuous constraints in the last query search (step 840), then both may be relaxed separately as discussed above (step 850) and the new results displayed. If the user does not wish to change any of the constraints, processing may again continue (step 860). Many different parameters may be adjusted in CR 126, such as flight times, airports, flight fares, airlines, or seat class.

FIGS. 8b–8d show example screen displays of data displayed on display 106 by presentation program 108 based on display data sent by CR 126. FIG. 8b shows an example screen display of an itinerary and criteria that may be adjusted. FIG. 8c includes additional criteria for the user to adjust by indicating a degree of flexibility. FIG. 8d shows an example screen display with the original itinerary and alternative itineraries based on the relaxed constraints.

There are many variations that may be made in accordance with the present invention. For example, the system could allow the user to enter many different types of criteria. The system may accept input in a different order, for example if the return date is of importance the user return flight may be selected before departure flight.

The example implementations above specifically mention air travel, however, the present invention may be used in conjunction with any type of travel including trains and buses. Similarly all references to airport may alternatively be any transportation terminal.

The foregoing description of an implementation of the invention is presented for purposes of illustration and description. It is not exhaustive and does not limit the invention to the precise form disclosed. Modifications and variations are possible in light of the above teachings or may be acquired from practicing the invention. For example, the described implementation includes software, but the present invention may be implemented as a combination of hardware and software or on hardware alone. The scope of the invention is defined by the claims and their equivalents.

What is claimed is:

1. A method for processing travel requests including the steps of:
   receiving a travel goal including a destination location and an appointment time;
   recommending a plurality of travel options and recommending a plurality of secondary modes of transportation based on the travel goal to ensure arrival at the destination location by the appointment time;
   invoking a transportation decision system to select one of the plurality of travel options and one of the secondary modes of ground transportation based on the recommended travel options and the recommended secondary ground transportation;
   determining whether an overnight stay is required;
   invoking a hotel decision support system to select a hotel when it is determined that an overnight stay is required; and
   invoking an activity and restaurant decision support system to select activities and restaurants in a vicinity of the destination location.

* * * * *